United States Patent
Sonoda et al.

(10) Patent No.: US 8,766,586 B2
(45) Date of Patent: Jul. 1, 2014

(54) MAGNETIC POLE POSITION DETECTING DEVICE FOR DETECTING MAGNETIC POLE POSITION OF ROTOR IN PERMANENT-MAGNET SYNCHRONOUS MOTOR

(71) Applicant: Fanuc Corporation, Yamanashi (JP)

(72) Inventors: Naoto Sonoda, Yamanashi (JP); Masato Aochi, Yamanashi (JP)

(73) Assignee: Fanuc Corporation, Minamitsuru-Gun, Yamanashi (JP)

( * ) Notice: Subject to any disclaimer, the term of this patent is extended or adjusted under 35 U.S.C. 154(b) by 0 days.

(21) Appl. No.: 13/856,087

(22) Filed: Apr. 3, 2013

(65) Prior Publication Data

US 2013/0307452 A1 Nov. 21, 2013

(30) Foreign Application Priority Data

May 21, 2012 (JP) ................................ 2012-115633

(51) Int. Cl.
*H02K 29/06* (2006.01)

(52) U.S. Cl.
USPC ................. 318/721; 318/400.38; 318/400.12; 318/823; 318/400.16

(58) Field of Classification Search
USPC ........... 318/400.32, 721, 369, 400.16, 400.12
See application file for complete search history.

(56) References Cited

U.S. PATENT DOCUMENTS

| | | | | |
|---|---|---|---|---|
| 5,801,509 A | * | 9/1998 | Sawa et al. | 318/705 |
| 2001/0019252 A1 | * | 9/2001 | Watanabe | 318/727 |
| 2008/0224645 A1 | * | 9/2008 | Ide | 318/608 |
| 2008/0309268 A1 | | 12/2008 | Morimoto et al. | |
| 2011/0309782 A1 | | 12/2011 | Bonin et al. | |
| 2012/0068638 A1 | | 3/2012 | Sieweke | |

FOREIGN PATENT DOCUMENTS

| | | |
|---|---|---|
| DE | 112006002501 T5 | 8/2008 |
| DE | 102009001955 A1 | 10/2010 |
| DE | 102010017411 A1 | 12/2011 |
| DE | 102010024238 A1 | 12/2011 |
| JP | 09-215382 A | 8/1997 |
| JP | 2001-078487 A | 3/2001 |
| JP | 2005-130582 A | 5/2005 |
| JP | 2005-151752 A | 6/2005 |
| JP | 2008-005646 A | 1/2008 |
| JP | 2011-050198 A | 3/2011 |
| WO | WO0030244 A1 | 5/2000 |
| WO | 2007034689 A1 | 3/2007 |
| WO | WO2011118258 A1 | 9/2011 |

OTHER PUBLICATIONS

Office Action dated Dec. 13, 2013, corresponds to German patent application No. 102013008191.2.

* cited by examiner

*Primary Examiner* — Eduardo Colon Santana
*Assistant Examiner* — Iftekhar Mustafa
(74) *Attorney, Agent, or Firm* — Lowe Hauptman & Ham, LLP

(57) ABSTRACT

A magnetic pole position detecting device includes a calculating unit for correcting a magnetic pole position detected by a magnetic pole position detecting unit. In this magnetic pole position detecting device, an additional phase is added to the magnetic pole position detected by the magnetic pole position detecting unit, in order to move a rotor. In relation to a movement amount before and after this movement, a movement amount detected by the magnetic pole position detecting unit is compared with a movement amount detected by an encoder. When a difference between them is larger than a predetermined threshold, a process of detecting the magnetic pole position is determined as false detection.

4 Claims, 4 Drawing Sheets

MAGNETIC POLE POSITION DETECTING DEVICE FOR DETECTING MAGNETIC POLE POSITION OF ROTOR IN PERMANENT-MAGNET SYNCHRONOUS MOTOR

RELATED APPLICATIONS

The present application is based on, and claims priority from, Japanese Application Number 2012-115633, filed May 21, 2012, the disclosure of which is hereby incorporated by reference herein in its entirety.

BACKGROUND OF THE INVENTION

1. Field of the Invention

The present invention relates to a magnetic pole position detecting device that detects a magnetic pole position of a rotor in a permanent-magnet synchronous motor.

2. Description of the Related Art

In a permanent-magnet synchronous motor (hereinafter, referred to simply as a motor) that includes a rotor including permanent magnets and that includes a stator including coils, electric currents are applied to the coils in accordance with a magnetic pole position of the rotor so that desired torque can be obtained. For this reason, while the magnetic pole position of the rotor is detected by a sensor such as an encoder, electric currents are applied at an appropriate exciting phase to drive and control the motor. Accordingly, in such a motor, at the time of starting the motor, position matching between a reference position of the sensor and the magnetic pole position of rotor is performed. A method of detecting a magnetic pole position of a rotor for such a purpose is disclosed in Japanese Patent No. 3408468, Japanese Patent No. 4816645, Japanese Patent No. 3805336, Japanese Laid-Open Patent Publication No. 2011-50198, and Japanese Patent No. 3971741, for example.

However, in a conventionally known method, accuracy of detection may be decreased due to a noise included in a feedback signal, friction acting on a rotor, external force caused by unbalance of a load, or the like. Further, in a method of detecting a magnetic pole position by moving a rotor, a movement amount of the rotor possibly becomes large, so that this method is not preferable from a standpoint of practical aspect. Furthermore, if coils of a motor are connected to amplifiers in a wrong connection order, if the number of magnetic poles of a motor is incorrectly set up, or if resolution of a sensor is incorrectly set up, or in a similar case, a magnetic pole position cannot be accurately detected.

An object of the present invention is, in a magnetic pole position detecting device that detects the pole position of a rotor, to prevent detection accuracy from decreasing due to a noise, friction, or external force, and to appropriately find false detection of a magnetic pole position so that safety and reliability of a motor can be improved.

SUMMARY OF THE INVENTION

According to a first invention of the present application, a magnetic pole position detecting device for detecting a magnetic pole position of a rotor at the time of starting a permanent-magnet synchronous motor comprising the rotor and a stator, the rotor including permanent magnets, the stator including coils, the magnetic pole position detecting device comprising: a magnetic pole position detecting unit for detecting a magnetic pole position of the rotor on the basis of behavior of the rotor when a current is applied at a predetermined exciting phase; a movement amount detecting unit for detecting a movement amount of the rotor when a current is applied at a predetermined exciting phase; a first magnetic pole position storage unit for storing a first magnetic pole position of the rotor detected by the magnetic pole position detecting unit; a current command outputting unit for outputting a current command causing a current to be applied at a first exciting phase that is obtained by adding a predetermined additional phase to the first magnetic pole position stored in the first magnetic pole position storage unit; a movement amount storage unit for storing a movement amount of the rotor from the time before output of the current command to the time after the output of the current command, the movement amount being detected by the movement amount detecting unit; a second magnetic pole position storage unit for storing a second magnetic pole position of the rotor after the output of the current command, the second magnetic pole position being detected by the magnetic pole position detecting unit; a determining unit for determining false detection when a difference between the additional phase and a difference between the first magnetic pole position and the second magnetic pole position is larger than a predetermined threshold; and a calculating unit for correcting the second magnetic pole position of the rotor to calculate a present magnetic pole position, on the basis of the first magnetic pole position, the second magnetic pole position, and the movement amount of the rotor, when the difference between the additional phase and the difference between the first magnetic pole position and the second magnetic pole position is equal to or smaller than the predetermined threshold, wherein the magnetic pole position detecting unit, the movement amount detecting unit, the current command outputting unit, the determining unit, and the calculating unit are adapted to repeatedly operate such that a process of calculating the present magnetic pole position is repeated at least once is provided.

According to a second invention of the present application, in the first invention, the calculating unit is adapted to calculate the present magnetic pole position by dividing a summed value by two, the summed value being obtained by summing the first magnetic pole position of the rotor, the second magnetic pole position of the rotor, and the movement amount of the rotor.

According to a third invention of the present application, in the first or second invention, the magnetic pole position detecting unit comprises: a movement direction detecting unit for detecting a movement direction in which the rotor is moved when a current is applied at a predetermined exciting phase; a magnetic pole position estimating unit for estimating the magnetic pole position of the rotor on the basis of the movement direction of the rotor detected by the movement direction detecting unit; and an additional current command outputting unit for outputting a current command causing a current to be applied at an exciting phase that is determined on the basis of the magnetic pole position estimated by the magnetic pole position estimating unit, wherein the magnetic pole position detecting unit is adapted to repeatedly operate the movement direction detecting unit, the magnetic pole position estimating unit, and the additional current command outputting unit to detect the magnetic pole position of the rotor.

According to a fourth invention of the present application, in the first, second, or third invention, the magnetic pole position detecting device further comprises a warning signal outputting unit for outputting a warning signal when the determining unit determines false detection.

These and other objects, features, and advantages of the present invention will become more apparent by referring to detailed description of exemplified embodiments of the present invention that are represented in the accompanying drawings.

DETAILED DESCRIPTION

Figure 1:
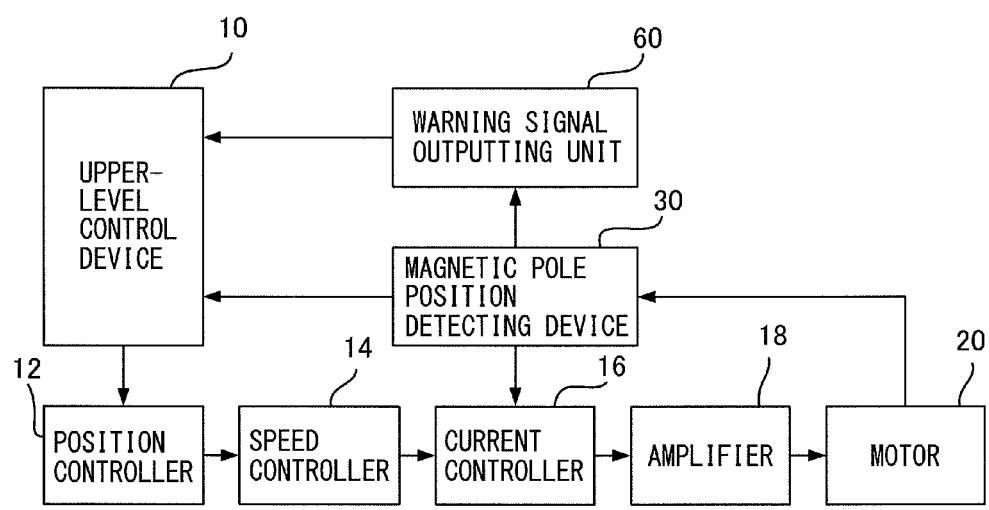
FIG. 1 is a block diagram illustrating a configuration of a control system to which the present invention can be applied.

In the following, embodiments of the present invention will be described with reference to the accompanying drawings. FIG. 1 is a block diagram illustrating a configuration of a control system to which the present invention can be applied. As illustrated in FIG. 1, this control system includes an upper-level control device 10, a position controller 12, a speed controller 14, a current controller 16, an amplifier 18, a motor 20, a magnetic pole position detecting device 30, and a warning signal outputting unit 60. The motor 20 is a known permanent-magnet synchronous motor that includes a rotor including permanent magnets, and a stator including coils. The motor 20 is also provided with a sensor that detects movement (a position and a speed) of the rotor is provided. An example of the sensor is an encoder (not illustrated).

The upper-level control device 10 controls operation of the motor 20 provided in a machine tool or the like. In accordance with a given machining program, for example, the upper-level control device 10 outputs a position command for controlling respective shafts of the motor 20 so as to appropriately operate the machine tool.

The position command output from the upper-level control device 10 is input to the position controller 12. The position controller 12 subtracts from the position command a position signal value fed back from the encoder of the motor 20 to calculate a position deviation. Then, the position controller 12 multiplies the position deviation by a position loop gain to calculate a speed command, and outputs the speed command to the speed controller 14. The speed controller 14 subtracts from the speed command a speed signal value fed back from the encoder of the motor 20 to calculate a speed deviation. On the basis of the speed deviation, the speed controller 14 calculates a current command by proportional-integral control, for example. The current command is input to the current controller 16. On the basis of the input current command, information on the current that is fed back from the amplifier 18 and flows in the stator of the motor 20, and information on a rotor position of the motor 20 that is detected by the encoder of the motor 20, the current controller 16 creates a control command to the amplifier 18. In accordance with the control command, the amplifier 18 supplies the motor 20 with a driving current corresponding to operation of the rotor of the motor 20.

In order to accurately control operation of the motor 20, a positional relationship between a reference position of the encoder and a magnetic pole position of the rotor of the motor 20 needs to be accurately determined. For this purpose, the magnetic pole position detecting device 30 is used for detecting a magnetic pole position of the rotor. The magnetic pole position detecting device 30 also includes the warning signal outputting unit 60 for giving a warning signal to the upper-level control device 10 when there is a possibility that the motor 20 has malfunctioned.

Figure 2:
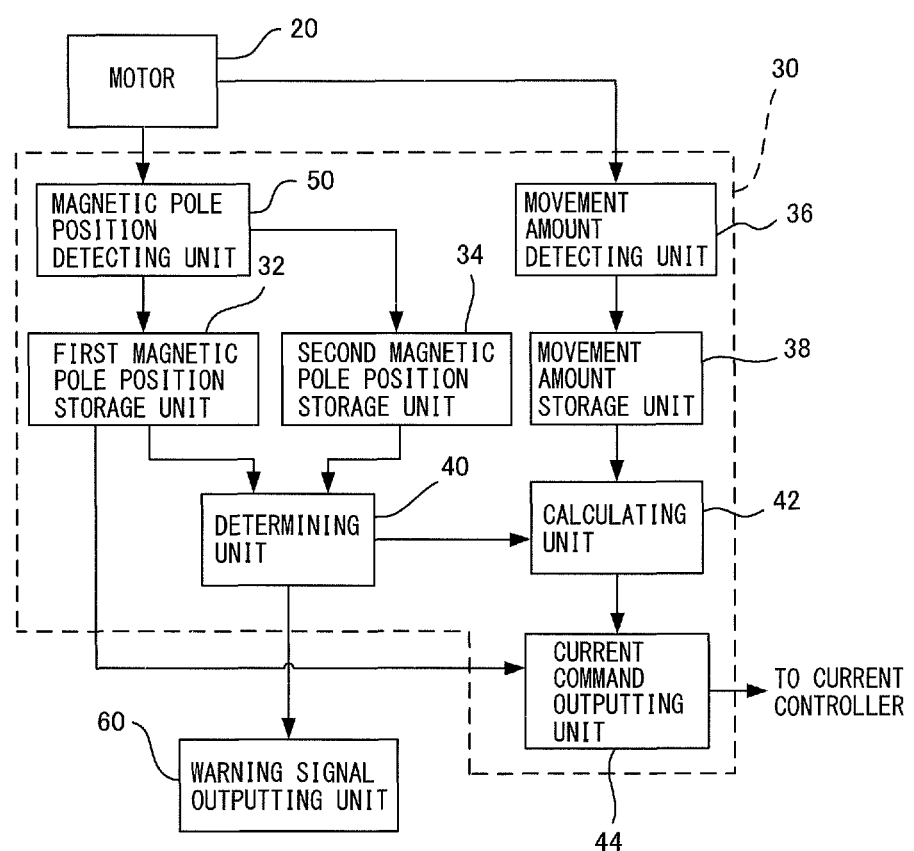
FIG. 2 is a block diagram functionally illustrating a configuration of a magnetic pole position detecting device according to one embodiment of the present invention.

Referring to FIG. 2, a configuration of the magnetic pole position detecting device 30 will be described in more detail. FIG. 2 is a block diagram functionally illustrating the configuration of the magnetic pole position detecting device 30 according to one embodiment of the present invention. The magnetic pole position detecting device 30 includes a magnetic pole position detecting unit 50, a first magnetic pole position storage unit 32, a second magnetic pole position storage unit 34, a movement amount detecting unit 36, a movement amount storage unit 38, a determining unit 40, a calculating unit 42, and a current command outputting unit 44.

The magnetic pole position detecting unit 50 detects a magnetic pole position of the rotor on the basis of behavior of the rotor of the motor 20, such as a moving direction of the rotor, when a current is applied at a predetermined exciting phase. The magnetic pole position is calculated in accordance with set values such as the predetermined number of the magnetic poles in the motor 20 and resolution of the sensor. Detecting operation of the magnetic pole position detecting unit 50 will be described below in more detail. A magnetic pole position detected by the magnetic pole position detecting unit 50 is stored in the first magnetic pole position storage unit 32 or the second magnetic pole position storage unit 34. A first magnetic pole position stored by the first magnetic pole position storage unit 32 is read out by the current command outputting unit 44 as necessary and used for creating a current command. A second magnetic pole position stored by the second magnetic pole position storage unit 34 is read out by the determining unit 40. The determining unit 40 determines whether or not detection of the magnetic pole position by the magnetic pole position detecting unit 50 is false. Details of the determining process by the determining unit 40 will be described below.

The movement amount detecting unit 36 detects a movement amount of the rotor on the basis of the output from the encoder of the motor 20. The movement amount detected by the movement amount detecting unit 36 is stored in the movement amount storage unit 38. The movement amount stored by the movement amount storage unit 38 is read out by the calculating unit 42 as necessary. When the determining unit 40 determines that there is no false detection, the calculating unit 42 performs calculation in accordance with a predetermined numerical formula in order to correct the magnetic pole position detected by the magnetic pole position detecting unit 50. A calculating process in the calculating unit 42 will be described below in more detail. A calculation result of the calculating unit 42 is input to the current command outputting unit 44, and on the basis of the calculation result, the current command outputting unit 44 creates a current command. The thus-created current command is output from the current command outputting unit 44 to the current controller 16.

Figure 3:
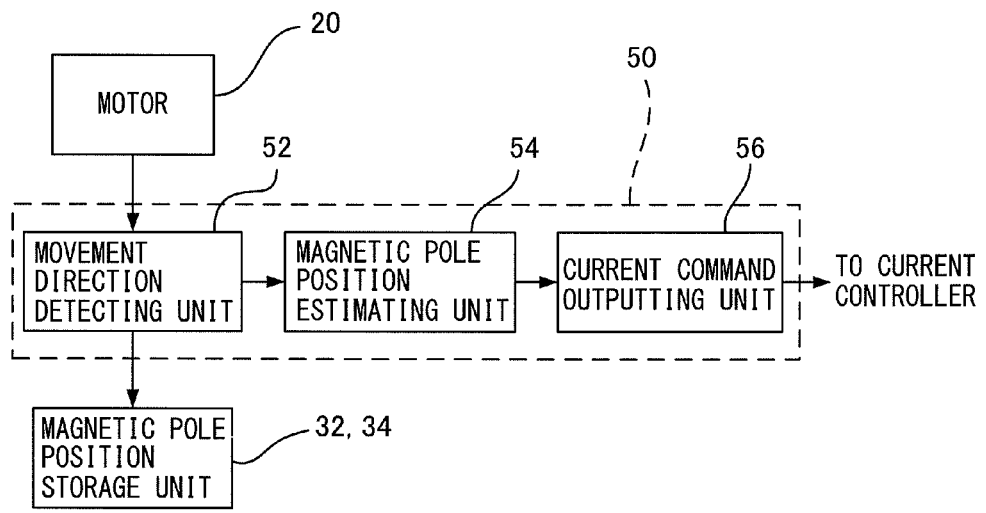
FIG. 3 is a block diagram functionally illustrating a configuration of a magnetic pole position detecting unit according to one embodiment of the present invention.

Next, referring to FIG. 3, a configuration of the magnetic pole position detecting unit 50 will be described in more detail. The configuration and advantageous effects of the magnetic pole position detecting unit 50 are not particularly limited in relation to the present invention. Accordingly, any detecting system capable of performing a known detecting process can be used as the magnetic pole position detecting unit 50. In one applicable example, a detection process similar to a detecting process disclosed in Japanese Patent No. 3408468 will be briefly described. FIG. 3 is a block diagram illustrating the configuration of the magnetic pole position detecting unit 50 according to one embodiment of the present invention. The magnetic pole position detecting unit 50 includes a movement direction detecting unit 52, a magnetic-pole-position estimating unit 54, and a second current command outputting unit 56.

The movement direction detecting unit 52 functions to detect a direction in which the rotor of the motor 20 moves when a current is applied at a predetermined exciting phase. The movement direction of the rotor is detected by the encoder of the motor 20. On the basis of the movement direction of the rotor detected by the movement direction detecting unit 52, the magnetic-pole-position roughly estimating unit 54 estimates a magnetic pole position of the rotor.

Torque acting on the motor 20 can be obtained from cross product of a current vector applied to the motor 20 and a magnetic flux vector. In other words, the torque is proportionate to sine of an angle θ (sin δ) defined between a phase angle of the current vector and a phase angle of the magnetic flux vector. Accordingly, when the equation 0°≤θ≤180° is satisfied, the equation sin θ≥0 is satisfied, and thus the torque is generated in a positive direction. When the equation 180°<θ<360° is satisfied, the equation sin θ<0 is satisfied, and thus the torque is generated in a negative direction. With this fact, it is possible to estimate the range within which a magnetic pole position (a phase angle of the magnetic flux vector) of the rotor falls in relation to a given exciting phase of a current, when a current is applied at the given exciting phase. For example, when a current is applied at an exciting phase of zero degree, if the rotor rotates in the negative direction, a magnetic pole position of the rotor can be presumed to fall within the range between 180° and 360°.

The second current command outputting unit 56 creates a current command (second current command) to apply a current at an exciting phase determined on the basis of the magnetic pole position estimated by the magnetic-pole-position estimating unit 54. For example, when a magnetic pole position falls within the range between 180° and 360°, a current command (second current command) is created to apply a current at a phase angle of 270° that is an intermediate value in the angle range. The second current command outputting unit 56 outputs this current command to the current controller 16. The motor 20 is then driven in accordance with the current command as described above.

Thereafter, the movement direction of the rotor is detected again by the movement direction detecting unit 52. On the basis of the detected movement direction, the magnetic-pole-position estimating unit 54 estimates whether the magnetic pole position of the rotor falls within the range between 180° and 270° or within the range between 270° and 360°, in the same manner as described above. On the basis of the estimated result, a current command is output from the second current command outputting unit 56 to the current controller 16. A series of these processes are repeated for a predetermined number of times so that the magnetic pole position of the rotor can be obtained. Alternatively, these processes may be repeated until the rotor does not move upon application of a current.

According to such a detecting process, even when a movement amount of the rotor is very small, a magnetic pole position of the rotor can be detected. Further, unlike the related art disclosed in Japanese Patent No. 3805336 or Japanese Laid-Open Patent Publication No. 2011-50198, the detecting process would not be influenced by saliency of the motor 20. Accordingly, the detecting process can be advantageously applied to a motor in which permanent magnets are attached onto a surface of the rotor. Meanwhile, a movement amount of the rotor is small, so that influence of mechanical friction acting on movement of the rotor becomes relatively large. Further, detecting accuracy is possibly degraded because of external force that acts locally on the motor as a result of unbalance of a load of the motor 20, for example. Furthermore, since this detecting process uses speed feedback in order to detect a movement direction of the rotor, detecting accuracy is also degraded when a signal includes a noise.

Figure 4:
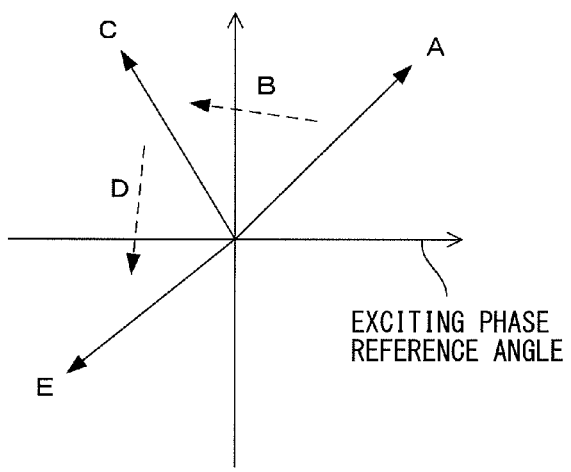
FIG. 4 illustrates a process for detecting a magnetic pole position according to one embodiment of the present invention.
Figure 5:
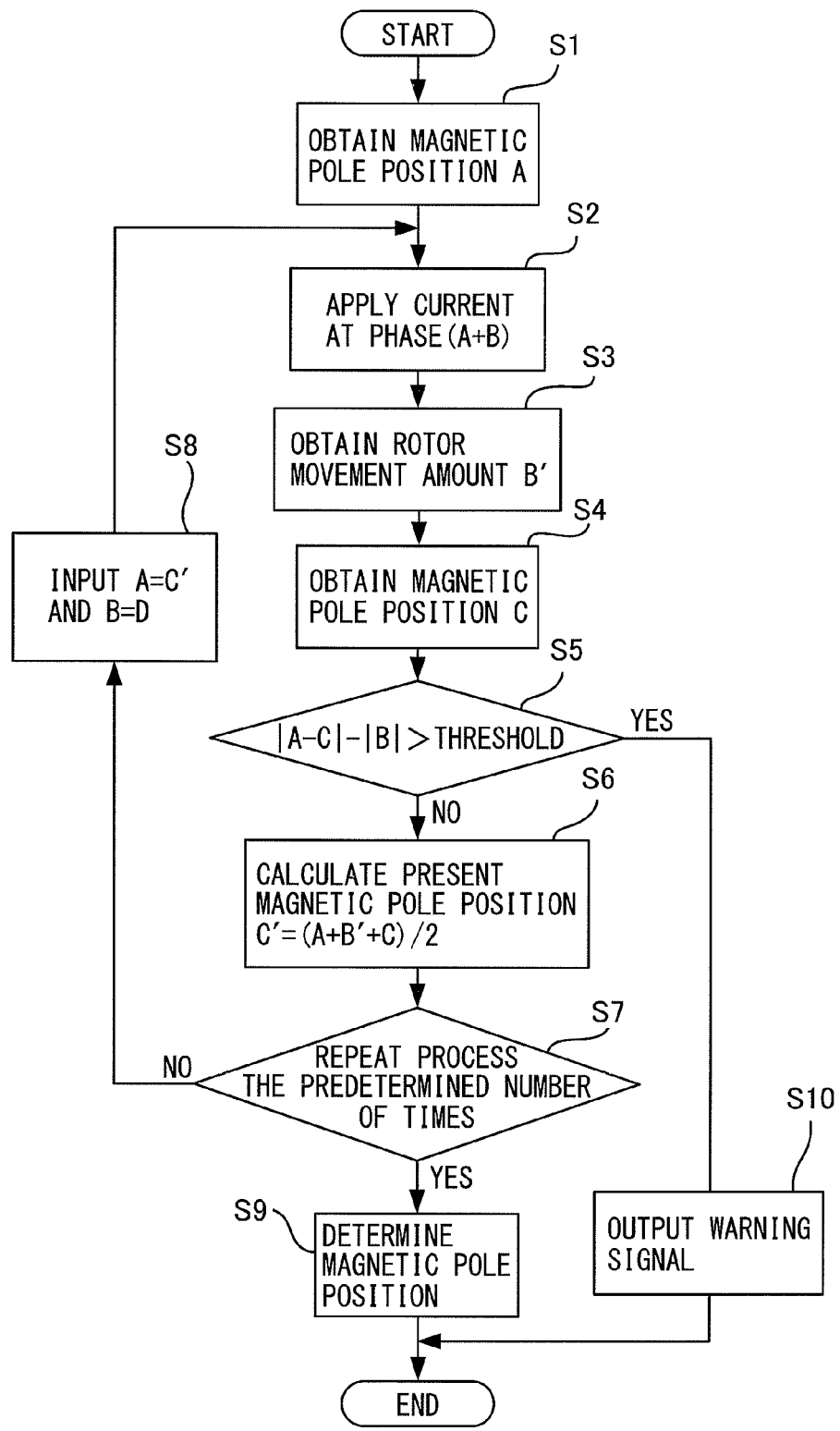
FIG. 5 is a flowchart of process for detecting a magnetic pole position by using the magnetic pole position detecting device according to the embodiment of the present invention.

In order to improve detecting accuracy of a magnetic pole position, a magnetic pole position detected by the magnetic pole position detecting unit 50 is corrected according to a detecting process of one embodiment of the present invention. Referring to FIG. 4 and FIG. 5, a series of process steps related to a correcting process will be described. FIG. 4 illustrates the process for detecting a magnetic pole position according to one embodiment of the present invention. FIG. 4 shows magnetic pole positions of the motor in relation to exciting phase reference angles of a current. Arrows depicted by solid lines represent magnetic pole positions in respective process steps. FIG. 5 is a flowchart of the process steps for detecting a magnetic pole position by the magnetic pole position detecting device 30 according to the embodiment of the present invention.

When the detecting process begins, a first magnetic pole position A of the rotor of the motor 20 is detected by the magnetic pole position detecting unit 50 (step S1). The first magnetic pole position A is determined by successively applying currents at predetermined exciting phases, and repeatedly detecting behavior of the rotor caused in response to the applied currents, for example, as described in relation to FIG. 3. The first magnetic pole position A is stored in the first magnetic pole position storage unit 32. Subsequently, the current command outputting unit 44 reads out the first magnetic pole position A from the first magnetic pole position storage unit 32, and outputs a current command to apply a current at a first exciting phase (=A+B) that is obtained by adding a predetermined additional phase B to the first magnetic pole position A. In this way, a current is applied at the first exciting phase (step S2). The additional phase B is appropriately set so as not to exceed a movable range restricted by mechanical specifications of the motor 20.

With a current applied at the first exciting phase, a magnetic pole position of the rotor is moved to a position where the magnetic pole position corresponds to the first exciting phase, or in other words, where torque is not generated. The movement amount detecting unit 36 obtains a movement amount B' from the encoder of the motor 20, the movement amount B' corresponding to a movement amount over which the rotor is actually moved when a current is applied at the first exciting phase (step S3). The movement amount B' is calculated as a difference between the magnetic pole positions before and after the movement, for example. The movement amount B' is stored in the movement amount storage unit 38.

Subsequently, a second magnetic pole position C that is the magnetic pole position after a current is applied at the first exciting phase is detected (step S4). For this process, the magnetic pole position detecting unit 50 is used in a similar way as when the first magnetic pole position A is obtained. The second magnetic pole position C is stored in the second magnetic pole position storage unit 34.

The determining unit 40 determines whether a result of the detection performed by the magnetic pole position detecting unit 50 is false or not, on the basis of the first magnetic pole position A stored in the first magnetic pole position storage unit 32, the second magnetic pole position C stored in the second magnetic pole position storage unit 34, and the additional phase B. Specifically, the determining unit 40 determines whether or not a difference (=|A−C|−|B|) between the additional phase |B| and a difference (|A−C|) between the first magnetic pole position A and the second magnetic pole position C is larger than a predetermined threshold (step S5).

At step S5, when it is determined that the value (|A−C|−|B|) is equal to or smaller than the predetermined threshold, the calculating unit 42 calculates a present magnetic pole position C'. Specifically, the calculating unit 42 divides a value (A+B'+C) by two to calculate the present magnetic pole position C'(step S6), the value (A+B'+C) being obtained by summing the first magnetic pole position A, the second magnetic pole position C, and the movement amount B' of the rotor stored in the movement amount storage unit 38. The present magnetic pole position C' is a correcting value of the magnetic pole position C detected by the magnetic pole position detecting unit 50.

Preferably, the calculating unit 42 repeatedly performs a process for calculating the present magnetic pole position C' a predetermined number of times, in order to improve detecting accuracy. In other words, when it is determined at step S7 that the repeat number of times of the calculating process performed by the calculating unit 42 does not reach the predetermined number of times, a value of the present magnetic pole position C' is used instead of the first magnetic pole position A (step S8) in order to repeat the above-described steps S2 to S7. For this process, a different additional phase D is used instead of the additional phase B that was used last time. In other words, a current is applied at a third exciting phase (=C'+D) that is obtained by adding the additional phase D to the magnetic pole position C' (step S2). The additional phase D is determined by taking the movable range of the rotor into consideration as in the case of the additional phase B. The additional phase D may be set as the same as the additional phase B. Then, a movement amount D' of the rotor when a current is applied at the third exciting phase is obtained by the movement amount detecting unit 36 (step S3). At step S4, a third magnetic pole position E is detected by the magnetic pole position detecting unit 50. Then, the calculating unit 42 performs the processes of steps S5 and S6 to calculate a present magnetic pole position E' in accordance with the formula: E'=(C'+D'+E)/2.

When it is determined at step S7 that the correcting process of step S6 has been performed the predetermined number of times, the present magnetic pole position C' that was calculated last is determined as an output value of the magnetic pole position detecting device 30 (step S9). The thus-determined magnetic pole position C' is used for operational control of the motor 20 that is performed by the upper-level control device 10. The above-described correcting process is not a simple feedback control that directly uses a feedback signal, so that detecting accuracy can be prevented from being degraded by a noise included in a feedback signal. In addition, by repeatedly performing the process of steps S2 to S6 the predetermined number of times, influence of friction and external force that can affect operation of the rotor can be limited to the minimum extent. Accordingly, the motor 20 can be more reliable.

When it is determined at step S5 that a value (|A−C|−|B|) is larger than the predetermined threshold, the magnetic pole position detecting device 30 activates the warning signal outputting unit 60 so that the warning signal outputting unit 60 outputs a warning signal to the upper-level control device 10 (step S10). When the upper-level control device 10 receives the warning signal, the upper-level control device 10 terminates magnetic excitation of the motor 20 to prevent malfunction of the motor 20. Several factors can be considered to be the cause of false detection at step S5. These factors include degradation in detecting accuracy due to a noise included in a signal, friction and external force, as described above. Further, these factors include mistakes in a wire connecting process of the coils of the motor 20, setting mistakes of the number of magnetic poles of the rotor, and setting mistakes of resolution of the sensor. In the magnetic pole position detecting process according to the present invention, when there is a possibility of false detection, a warning signal is sent to stop operation of the motor. Thereby, malfunction of the motor 20 can be prevented, and safety of the motor 20 is improved.

The embodiments of the present invention have been described. It is obvious for a person skilled in the art that the present invention can also be embodied by combining any features of the embodiments explicitly or implicitly disclosed in the present specification.

Effect of the Invention

According to the first invention, a magnetic pole position of the rotor is detected on the basis of behavior of the rotor when a current is applied at a predetermined exciting phase. A current is then applied at an exciting phase obtained by adding an additional phase to the detected magnetic pole position, in order to move the rotor. For this process, the detected magnetic pole position is corrected with a movement amount of the rotor obtained from the sensor. In this way, a present magnetic pole position is calculated. This prevents detecting accuracy from being degraded due to a noise, friction, external force or the like. In addition, it can be determined whether or not a result of the detecting process for detecting a magnetic pole position is false by comparing the movement amount of the rotor, which is obtained from a difference in the magnetic pole positions before and after application of the current, with the additional phase. Further, it can be determined when the coils of the motor have been connected to the amplifiers in the wrong connection order, when the number of the magnetic poles of the motor has been erroneously set, or when resolution of the sensor is erroneously set, for example. This allows a warning signal to be output so as to terminate operation of the motor, when a magnetic pole position is erroneously detected, and safety or reliability of the motor is possibly impaired.

According to the second invention, in accordance with a predetermined formula, a present magnetic pole position is calculated from the detected magnetic pole position and the detected movement amount. In this way, a feedback signal is not directly used, so that detecting accuracy can be prevented from being degraded by a noise included in a feedback signal.

According to the third invention, a movement direction of the rotor when a current is applied at a predetermined exciting phase is detected, and based on this movement direction, a magnetic pole position of the rotor is estimated. Then, on the basis of this estimated result, an exciting phase at which a current will be applied in the next step is obtained. This process is repeated so as to detect a magnetic pole position of the rotor. With such a configuration, a magnetic pole position can be detected even when a movement amount of the rotor is extremely small.

According to the fourth invention, when there is a possibility that a magnetic pole position is erroneously detected, operation of the motor can be appropriately stopped. This can prevent malfunction of the motor from occurring. As a result, the motor can be more reliable.

Although the invention has been shown and described with exemplary embodiments thereof, it should be understood by a person skilled in the art that the foregoing and various other changes, omissions and additions may be made therein and thereto without departing from the spirit and scope of the invention.

What is claimed is:

1. A magnetic pole position detecting device for detecting a magnetic pole position of a rotor at the time of starting a permanent-magnet synchronous motor comprising the rotor and a stator, the rotor including permanent magnets, the stator including coils, the magnetic pole position detecting device comprising:
    a magnetic pole position detecting unit for detecting a magnetic pole position of the rotor on the basis of behavior of the rotor when a current is applied at a predetermined exciting phase;
    a movement amount detecting unit for detecting a movement amount of the rotor when a current is applied at a predetermined exciting phase;
    a first magnetic pole position storage unit for storing a first magnetic pole position of the rotor detected by the magnetic pole position detecting unit;
    a current command outputting unit for outputting a current command causing a current to be applied at a first exciting phase that is obtained by adding a predetermined additional phase to the first magnetic pole position stored in the first magnetic pole position storage unit;
    a movement amount storage unit for storing a movement amount of the rotor from the time before output of the current command to the time after the output of the current command, the movement amount being detected by the movement amount detecting unit;
    a second magnetic pole position storage unit for storing a second magnetic pole position of the rotor after the output of the current command, the second magnetic pole position being detected by the magnetic pole position detecting unit;
    a determining unit for determining false detection when a difference between the additional phase and a difference between the first magnetic pole position and the second magnetic pole position is larger than a predetermined threshold; and
    a calculating unit for correcting the second magnetic pole position of the rotor to calculate a present magnetic pole position, on the basis of the first magnetic pole position, the second magnetic pole position, and the movement amount of the rotor, when the difference between the additional phase and the difference between the first magnetic pole position and the second magnetic pole position is equal to or smaller than the predetermined threshold,
    wherein the magnetic pole position detecting unit, the movement amount detecting unit, the current command outputting unit, the determining unit, and the calculating unit are adapted to repeatedly operate such that a process of calculating the present magnetic pole position is repeated at least once.

2. The magnetic pole position detecting device according to claim 1, wherein the calculating unit is adapted to calculate the present magnetic pole position by dividing a summed value by two, the summed value being obtained by summing the first magnetic pole position of the rotor, the second magnetic pole position of the rotor, and the movement amount of the rotor.

3. The magnetic pole position detecting device according to claim 1, wherein the magnetic pole position detecting unit comprises:
    a movement direction detecting unit for detecting a movement direction in which the rotor is moved when a current is applied at a predetermined exciting phase;
    a magnetic pole position estimating unit for estimating the magnetic pole position of the rotor on the basis of the movement direction of the rotor detected by the movement direction detecting unit; and
    an additional current command outputting unit for outputting a current command causing a current to be applied at an exciting phase that is determined on the basis of the magnetic pole position estimated by the magnetic pole position estimating unit,
    wherein the magnetic pole position detecting unit is adapted to repeatedly operate the movement direction detecting unit, the magnetic pole position estimating unit, and the additional current command outputting unit to detect the magnetic pole position of the rotor.

4. The magnetic pole position detecting device according to claim 1, further comprising a warning signal outputting unit for outputting a warning signal when the determining unit determines false detection.

* * * * *